United States Patent
Nakata

(10) Patent No.: US 12,439,381 B2
(45) Date of Patent: Oct. 7, 2025

(54) RELAY DEVICE AND RELAY METHOD

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 18/147,027

(22) Filed: Dec. 28, 2022

(65) Prior Publication Data

US 2023/0224870 A1 Jul. 13, 2023

(30) Foreign Application Priority Data

Jan. 7, 2022 (JP) ................................. 2022-001915

(51) Int. Cl.
*H04W 28/06* (2009.01)
*H04B 7/155* (2006.01)
*H04W 40/24* (2009.01)
*H04W 72/02* (2009.01)

(52) U.S. Cl.
CPC ........ *H04W 72/02* (2013.01); *H04B 7/15542* (2013.01); *H04W 40/248* (2013.01)

(58) Field of Classification Search
CPC . H04B 7/15542; H04W 40/248; H04W 72/02
See application file for complete search history.

(56) References Cited

U.S. PATENT DOCUMENTS

| 7,486,696 B2 * | 2/2009 | Garg ................... H04L 47/29 370/468 |
| 9,860,786 B1 * | 1/2018 | Wang ................... H04W 28/06 |
| 10,785,143 B1 * | 9/2020 | Morris ................. H04L 45/04 |
| 11,831,553 B2 * | 11/2023 | Dutta ................... H04L 45/34 |
| 2008/0130661 A1 * | 6/2008 | Jiang ................... H04L 12/18 370/401 |
| 2012/0294211 A1 * | 11/2012 | Zhu ..................... H04L 69/04 370/310 |
| 2017/0070543 A1 | 3/2017 | Balasubramanian et al. |
| 2019/0044867 A1 * | 2/2019 | Chang .................. H04L 45/38 |

FOREIGN PATENT DOCUMENTS

| JP | 2012044344 A | * | 3/2012 |
| JP | 2018-530226 A | | 10/2018 |

* cited by examiner

*Primary Examiner* — Phuc H Tran
(74) *Attorney, Agent, or Firm* — Harness, Dickey & Pierce, P.L.C.

(57) ABSTRACT

A relay device includes: a storage unit storing a correspondence table that correlates header information with a relay resource, the relay resource implementing a communication request class defined based on the header information; a data acquisition unit acquiring the data transmitted from the transmission source device as acquired data; a relay resource determination unit determining a relay resource for the acquired data based on header information included in the acquired data and the correspondence table; and a data transmission unit transmitting the acquired data to the destination device using the relay resource determined by the relay resource determination unit.

12 Claims, 14 Drawing Sheets

TRANSMISSION SOURCE TABLE

| ENTRY | HEADER INFO | | | COMM REQ CLASS |
|---|---|---|---|---|
| | SRC ADDR | DST ADDR | PROTOCOL | QoS CLASS |
| 1 | 1.0.0.1 | a.b.c.* | ANY | 1 |
| 2 | | ANY | | 2 |
| 3 | 1.0.0.2 | a.b.c.* | ANY | 1 |
| 4 | | ANY | | 3 |
| 5 | 1.0.2.* | ANY | RTP | 4 |
| 6 | | | ANY | 2 |
| 7 | ANY | ANY | ANY | 2 |

FIG. 4

RELAY RESOURCE TABLE

| ENTRY | COMM REQ CLASS | COMM CONVERSION PROCESS | IDENTIFY RESOURCE |
|---|---|---|---|
| | QoS CLASS | | |
| 1 | 1 | NAPT e.f.g.h | PORT 50001-51000 |
| 2 | 2 | NAT | IP ADDRESS i.j.k.1-3 |
| 3 | 3 | Tunnel on e.f.g.h | TUNNEL SERVER ADDRESS |
| 4 | 4 | Tunnel on e.f.g.h / i.j.k.l | TUNNEL SERVER ADDRESS |

FIG. 5

CORRESPONDENCE TABLE

| ENTRY | LAN ADDRESS | WAN ADDRESS |
|---|---|---|
| 1 | 1.0.0.1:62000 | e.f.g.h:510010 |
| | .. | .. |

FIG. 9

TRANSMISSION SOURCE TABLE

| ENTRY | HEADER INFO | | | COMM REQ CLASS | |
|---|---|---|---|---|---|
| | SRC ADDR | DST ADDR | PROTOCOL | QoS CLASS | CHARGE DEST |
| 1 | 1.0.2.* | APP SERVER | ANY | 1 | VENDOR |
| 2 | 1.0.2.* | ANY | RTP | 1 | USER |
| 3 | | | ANY | 2 | USER |

FIG. 10

RELAY RESOURCE TABLE

| ENTRY | COMM REQ CLASS | | IDENTIFY RESOURCE |
|---|---|---|---|
| | QoS CLASS | CHARGE DEST | ALLOCATED SOURCE PORT AREA |
| 1 | 1 | VENDOR | 50001-50100 |
| 2 | | USER | 50101-50500 |
| 3 | 2 | USER | 50501-50600 |
| 4 | | USER | 50601-51000 |

FIG. 11

CORRESPONDENCE TABLE

| ENTRY | LAN ADDRESS | WAN ADDRESS |
|---|---|---|
| 1 | 1.0.2.1:62000 | e.f.g.h:50010 |
| | .. | .. |

FIG. 14

TRANSMISSION SOURCE TABLE

| ENTRY | HEADER INFO | | | COMM REQ CLASS | |
|---|---|---|---|---|---|
| | SRC ADDR | DST ADDR | PROTOCOL | VIA NW | CHARGE DEST |
| 1 | 1.0.0.1 | a.b.c.* | ANY | 1 | VENDOR |
| 2 | | ANY | | 2 | ADVERTISER |
| 3 | 1.0.0.2 | a.b.c.* | ANY | 1 | VENDOR |
| 4 | | ANY | | 2 | VENDOR |
| 5 | 1.0.2.* | ANY | RTP | 1 | USER |
| 6 | | | ANY | 2 | ADVERTISER |

FIG. 15

RELAY RESOURCE TABLE

| ENTRY | COMM REQ CLASS | | IDENTIFY RESOURCE | |
|---|---|---|---|---|
| | VIA NW | CHARGE DEST | SOURCE PORT AREA | SOURCE IP ADDRESS AREA |
| 1 | 1 | VENDOR | 50001-55000 | e.f.g.h |
| 2 | | USER | 55001-60000 | |
| 3 | 2 | VENDOR | 50001-55000 | i.j.k.1 |
| 4 | | ADVERTISER | 55001-60000 | |
| 5 | | OPERATOR | - | i.j.k.2-5 |

FIG. 16

CORRESPONDENCE TABLE

| ENTRY | LAN ADDRESS | WAN ADDRESS |
|---|---|---|
| 1 | 1.0.0.1:62000 | e.f.g.h:510010 |
| | .. | .. |

FIG. 18

TRANSMISSION SOURCE TABLE

| ENTRY | HEADER INFO | | | COMM REQ CLASS |
|---|---|---|---|---|
| | SRC ADDR | DST ADDR | DST PORT | CHARGE DEST |
| 1 | ANY | 1.0.1.1 | 5000, 5001 | 1ST VENDOR |
| 2 | ANY | 1.0.1.10 | 80, 6000-6100 | 2ND VENDOR |
| 3 | 1.0.0.1 | 1.0.1.* | ANY | 1ST USER |
| 4 | 1.0.0.5 | 1.0.1.* | ANY | 2ND USER |

FIG. 19

RELAY RESOURCE TABLE

| ENTRY | COMM REQ CLASS | IDENTIFY RESOURCE |
|---|---|---|
| | CHARGE DEST | TUNNEL SERVER ADDRESS |
| 1 | 1ST VENDOR | p.q.r.1 |
| 2 | 2ND VENDOR | p.q.r.2 |
| 3 | 3RD VENDOR | p.q.r.3 |
| 4 | 1ST USER | p.q.r.4 |
| 5 | 2ND USER | p.q.r.5 |

FIG. 20

CORRESPONDENCE TABLE

| ENTRY | LAN ADDRESS | HEADER TO BE ADDED | |
|---|---|---|---|
| | | SRC ADDR | DST ADDR |
| 1 | 1.0.0.1:62000 | e.f.g.h | p.q.r.2 |
| 2 | ·· | e.f.g.h | p.q.r.3 |

FIG. 22

TRANSMISSION SOURCE TABLE

| ENTRY | HEADER INFO | COMM REQ CLASS |
|---|---|---|
|  | SRC PORT | QoS CLASS (WHETHER LOW DELAY COMMUNICATION CAN BE INCLUDED) |
| 1 | 5001-5500 | YES |
| 2 | ANY | NO |

FIG. 23

RELAY RESOURCE TABLE

| ENTRY | COMM REQ CLASS | IDENTIFY RESOURCE |
|---|---|---|
|  | QoS CLASS | VIA IF |
| 1 | LOW DELAY | LAN540A |
| 2 | NORMAL | LAN540A, LAN540B |

FIG. 24

CORRESPONDENCE TABLE

| ENTRY | DESTINATION ADDRESS | VIA IF |
|---|---|---|
| 1 | 1.0.1.1 | LAN540A |
| 2 | · · |  |

RELAY DEVICE AND RELAY METHOD

CROSS REFERENCE TO RELATED APPLICATION

The present application claims the benefit of priority from Japanese Patent Application No. 2022-001915 filed on Jan. 7, 2022. The entire disclosure of the above application is incorporated herein by reference.

TECHNICAL FIELD

The present disclosure relates to a relay device and a relay method, each of which is used for data relay.

BACKGROUND

Conventionally, a relay device that relays a communication between a terminal and a destination device via a network is known.

SUMMARY

The present disclosure provides a relay device, which includes a storage unit, a data acquisition unit, a relay resource determination unit, and a data transmission unit. The storage unit stores a correspondence table that correlates header information with a relay resource, the relay resource implementing a communication request class defined based on the header information. The data acquisition unit acquires the data transmitted from the transmission source device as acquired data. The relay resource determination unit determines a relay resource for the acquired data based on header information included in the acquired data and the correspondence table. The data transmission unit transmits the acquired data to the destination device using the relay resource determined by the relay resource determination unit.

BRIEF DESCRIPTION OF DRAWINGS

Objects, features and advantages of the present disclosure will become apparent from the following detailed description made with reference to the accompanying drawings. In the drawings:

FIG. 3 is a diagram showing an example of a transmission source table;

FIG. 4 is a diagram showing an example of a relay resource table;

FIG. 5 is a diagram showing an example of a correspondence table;

FIG. 9 is a diagram showing an example of a transmission source table stored in a storage unit according to the second embodiment;

FIG. 10 is a diagram showing an example of a relay resource table stored in a storage unit according to the second embodiment;

FIG. 11 is a diagram showing an example of a correspondence table stored in a storage unit according to the second embodiment;

FIG. 14 is a diagram showing an example of a transmission source table stored in a storage unit according to the third embodiment;

FIG. 15 is a diagram showing an example of a relay resource table stored in a storage unit according to the third embodiment;

FIG. 16 is a diagram showing an example of a correspondence table stored in a storage unit according to the third embodiment;

FIG. 18 is a diagram showing an example of a transmission source table stored in a storage unit according to the fourth embodiment;

FIG. 19 is a diagram showing an example of a relay resource table stored in a storage unit according to the fourth embodiment;

FIG. 20 is a diagram showing an example of a correspondence table stored in a storage unit according to the fourth embodiment;

FIG. 22 is a diagram showing an example of a transmission source table stored in a storage unit according to the fifth embodiment;

FIG. 23 is a diagram showing an example of a relay resource table stored in a storage unit according to the fifth embodiment; and FIG. 24 is a diagram showing an example of a correspondence table stored in a storage unit according to the fifth embodiment.

DETAILED DESCRIPTION

Figure 1:
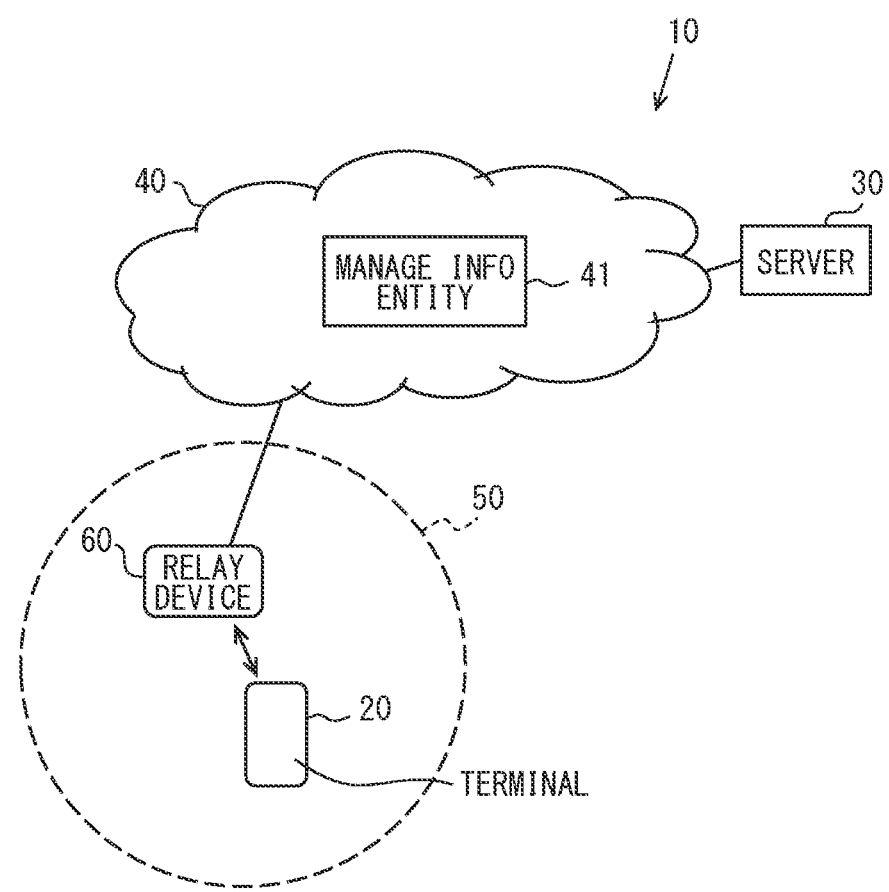
FIG. 1 is a diagram showing an overall configuration of a communication system according to a first embodiment of the present disclosure.

In a known art related to a data relay technology, a first terminal communicates with a base station via WWAN. The first terminal relays a communication between a second terminal and the base station by communicating with the second terminal via WLAN. The second terminal performs signaling when requesting to join a multimedia service, and transmits a request signaling message during the execution of signaling. The first terminal intercepts the request signaling message, and determines a service type.

In the above-described known art, signaling is required for the transmission source device in order to determine a service type. Thus, when the transmission source device does not perform the signaling, the relay device may fail to determine the service type. Further, when the transmission source device does not perform the signaling, a relay resource corresponding to the service type cannot be selected.

The relay device is expected to select the relay resource corresponding to the type or class of communication request requested by the source device, in addition to the selection of service type. When the transmission source device does not perform the signaling, a proper relay resource cannot be selected corresponding to the communication request requested by the transmission source device.

According to an aspect of the present disclosure, a relay device includes a storage unit, a data acquisition unit, a relay resource determination unit, and a data transmission unit. The storage unit stores a correspondence table that correlates header information with a relay resource, the relay resource implementing a communication request class defined based on the header information. The data acquisition unit acquires the data transmitted from the transmission source device as acquired data. The relay resource determination unit determines a relay resource for the acquired data based on header information included in the acquired data and the correspondence table. The data transmission unit transmits the acquired data to the destination device using the relay resource determined by the relay resource determination unit.

In the above configuration, when the relay device acquires the data from the transmission source device, the relay device determines the relay resource by referring to the header information included in the acquired data and the correspondence table. The correspondence table correlates each header information with corresponding relay resource. Each relay resource implements the communication request class defined by the header information. By determining the relay resource based on the header information and the correspondence table, it is possible to select the relay resource corresponding to the communication request class requested by the acquired data. With this configuration, the relay device can select the proper relay resource corresponding to the communication request even when the transmission source device does not perform the signaling.

According to another aspect of the present disclosure, a relay method, which acquires data from a transmission source device and transmits the acquired data to a destination device, includes: acquiring the data transmitted from the transmission source device; determining a relay resource for the acquired data based on header information included in the acquired data and a correspondence table, the correspondence table defining a correlation between the header information and a relay resource, the relay resource implementing a communication request class defined based on the header information; and transmitting the acquired data to the destination device using the determined relay resource.

First Embodiment (Overall Configuration)

The following will describe embodiments of the present disclosure with reference to the drawings. FIG. 1 shows an overall configuration of a communication system 10 including a relay device 60 of a first embodiment. The communication system 10 includes a terminal 20 and a server 30. The terminal 20 and the server communicate with one another via a wide area network (WAN) 40 and a local area network (LAN) 50.

For example, the terminal 20 is provided by a mobile terminal in the present embodiment. For example, the terminal 20 is a smartphone. The terminal 20 may be a fixed terminal that has a fixed position. The terminal 20 wirelessly communicates with the relay device 60 included in the LAN 50. The terminal 20 corresponds to a data transmission source of the relay device 60, that is, corresponds to a transmission source device. The server 30 corresponds to a destination device. The data transmitted from the terminal 20 is described in accordance with a predetermined protocol, and has a configuration including a header section and a data body. The header section describes header information. The data body is also referred to as payload.

The server 30 is connected to the WAN 40. For example, the data that communicated between the server 30 and the terminal 20 is application data provided from the server 30 to the terminal 20.

The WAN 40 is a network that performs communications based on global IP addresses. In FIG. 1, only one WAN 40 is shown. As another example, the communication system 10 may include multiple WANs 40. When the communication system 10 includes multiple WANs 40, the multiple WANs 40 are communicably connected with one another.

The WAN 40 includes a management information entity (MANAGE INFO ENTITY) 41, which manages resources of the WAN 40 and is operated by an administrator of the WAN 40. The management information entity 41 corresponds to a management device. When the communication system includes multiple WANs 40, the management information entity 41 may be individually provided for each WAN 40. The management information entity 41 separately manages resources of respective WANs 40.

The LAN 50 is a network that performs a communication based on private IP addresses. For example, the LAN 50 is a wireless LAN for wireless communication. As another example, the LAN 50 may be a wired LAN, or a combination of a wireless LAN and a wired LAN.

The relay device 60 communicates with the terminal 20 via the LAN 50. The relay device 60 has a global IP address, and relays the communication between the terminal 20 and the server 30 by connecting to the WAN 40.

(Configuration of Relay Device 60)

Figure 2:
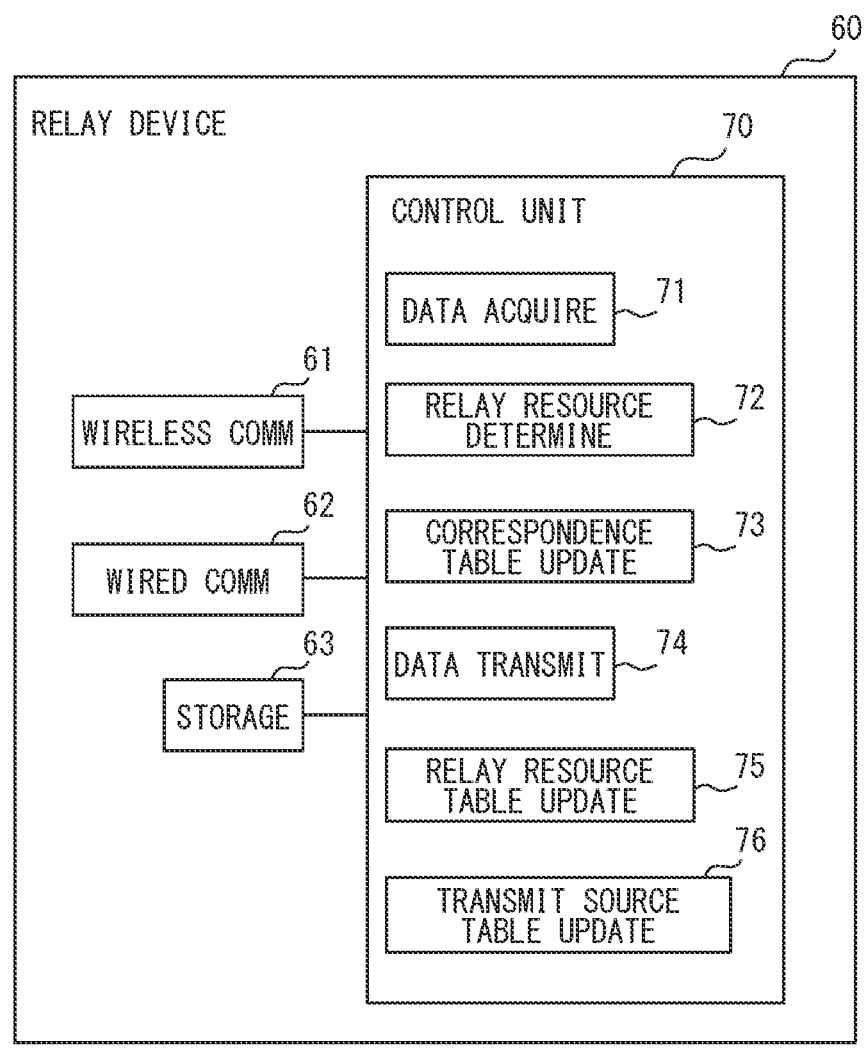
FIG. 2 is a diagram showing a configuration of a relay device.

FIG. 2 shows a configuration of the relay device 60. The relay device 60 includes a wireless communication unit (WIRELESS COMM) 61, a wired communication unit (WIRED COMM) 62, a storage unit (STORAGE) 63, and a control unit 70. The wireless communication unit 61 includes a wireless communication circuit, an antenna, or the like. The wireless communication unit 61 communicates with the terminal 20, which connects to the LAN 50. The wireless communication unit 61 receives data transmitted from the terminal 20 as a wireless signal. The data is transmitted in predetermined transmission units. A single transmission unit of data may be referred to as a packet. For example, a short range wireless communication method, such as a method defined under IEEE802.11 may be used as a wireless communication method between the wireless communication unit 61 and the terminal 20.

The wired communication unit 62 is connected to the WAN 40 by a communication wire, and communicates with other devices, for example, the server 30, which is connected to the WAN 40. The wired communication unit 62 performs the communication by connecting to the WAN 40. Thus, the wired communication unit 62 is also referred to as a wide area communication unit.

The storage unit 63 stores various information in a rewritable memory. The storage unit 63 may be provided by a flash memory. The storage unit 63 stores a transmission source table, a relay resource table, and a correspondence table, which will be described below.

FIG. 3 shows an example of the transmission source table. The transmission source table includes header information (HEADER INFO) and communication request class (COMM REQ CLASS) in correlated manner. The header information is information included in the data transmitted from the transmission source device, that is, the terminal 20.

In FIG. 3, "SRC ADDR" indicates a source address, and "DST ADDR" indicates a destination address. The source address is a private IP address, and the destination address is a global IP address. These IP addresses are stored in the IP header. In the table, "any" indicates an optional element. When there is an applicable entry, the applicable entry takes is prioritized. An entry means each row included in the table. The real-time transport protocol (RTP) is a protocol for transmitting audio or video data in real time.

In the following description, each entry included in the transmission source table is referred to as a source entry. This is to distinguish the entries included in the transmission source table shown in FIG. 3 from entries included in the relay resource table shown in FIG. 4 and entries included in the correspondence table shown in FIG. 5. Each entry included in the relay resource table is referred to as a relay resource entry, and each entry included in the correspondence table is referred to as a correspondence entry.

As shown in FIG. 3, the three types of information, that is, transmission source table defines source address, destination address, and protocol as the header information. As another example, the header information may be defined in five tuples, for example, source address, source port, destination address, destination port, and protocol. Alternatively, one to four types among these five types of information may be properly defined in the header information.

The communication request class is a class requested by the transmission source device when performing data communication. The communication requirement class defines a class related to the data communication. In the transmission source table shown in FIG. 3, quality of service (QoS) class is defined as an example of the communication request class. The QoS class is defined by numerical value. The numerical value of QoS class indicates a classification, but not an upper or a lower rank. Thus, the QoS class may also be referred to as a QoS classification.

FIG. 4 shows an example of the relay resource table. The relay resource table shown in FIG. 4 includes relay resource entries having QoS classes of 1 to 4 as communication request class. The relay resource table may include the relay resource entry corresponding to the communication request class included in the transmission source table, and may also include the relay resource entry corresponding to the communication request class that is not included in the transmission source table.

The "communication conversion process (COMM CONVERSION PROCESS)" field included in the relay resource table defines conversion process to be performed. The "identification resource (IDENTIFY RESOURCE)" field included in the relay resource table is information that distinguishes network resources.

The first relay resource entry is defined to have the QoS class of 1. The conversion process defined by the QoS class of 1 is "NAPT e.f.g.h", which means execution of NAPT and conversion of the source address to the global address of "e.f.g.h".

NAPT is an abbreviation for network address port translation, and is a process of converting an IP address and a port number into another IP address and another port number. The port number after conversion is defined in an "identification resource" field. The "ports 50001-51000" indicate that port numbers defined within a range of 50001 to 51000 can be used as the port number after conversion.

The second relay resource entry has a communication conversion process of NAT. NAT is an abbreviation for network address translation, and is a process of converting an IP address into another IP address. The IP address after conversion is defined in the identification resource as "IP address i.j.k.1-3". The IP address of "i.j.k.1-3" indicates one of IP addresses "i.j.k.1", "i.j.k.2", and "i.j.k.3". This IP address is a global IP address. The global IP address "i.j.k.1-3" indicates a public network different from the global IP address "e.f.g.h", and a communication quality of the public network defined by "i.j.k.1-3" is inferior to a communication quality of the public network defined by "e.f.g.h". The public network defined by "i.j.k.1-3" is, for example, a public wireless LAN or a mobile virtual network operator (MVNO). Each of the first and second relay resource entries in the relay resource table defines, as the communication request class, a class of the communication quality.

The communication conversion process of a third relay resource entry is defined as "tunnel on e.f.g.h". The "tunnel on e.f.g.h." means the communication is performed by tunneling and the source address is converted to the global IP address of "e.f.g.h.". The identification resource of the third relay resource entry is defined as a tunnel server address. This means that the destination address of transmission by tunneling is set to a predetermined tunnel server address.

The communication conversion process of a fourth relay resource entry is defined as "tunnel on e.f.g.h/i.j.k.l". The "i.j.k.l" also indicates a global IP address. The "i.j.k.l" indicates a global IP address that uses a different public network from the public network used by the global IP address of "e.f.g.h". The communication conversion process of the fourth relay resource entry indicates use of one global IP addresses, which has a better communication quality at a time of the data relay, between the two global IP addresses. Since the communication quality of each network dynamically changes, the public network having better communication quality at the time of data relay is selected for the data communication. The meaning of the identification resource of the fourth relay resource entry is the same as that of the third relay resource entry.

FIG. 5 shows an example of the correspondence table. The correspondence table shown in FIG. 5 is a table for converting a source address from a private IP address to a global IP address. In the example shown in FIG. 5, only a first correspondence entry is included in the correspondence table. The correspondence table is generated from a transmission source table and a relay resource table. Specifically, each correspondence entry is generated by linking each source entry with a corresponding relay resource entry based on the same communication request class included in each other's entries. Thus, the correspondence table correlates the header information with corresponding relay resource. Each relay resource implements the communication request class defined based on the header information. A specific generation method of the correspondence table will be described later.

As shown in FIG. 2, the control unit 70 includes at least one processor. For example, the control unit 70 may be implemented by a computer including a processor, a non-volatile memory, a RAM, an I/O, and a bus line connecting these components. The non-volatile memory stores a relay program that operates a general-purpose computer as the control unit 70. The processor executes the program stored in the non-volatile memory by using a temporary storage function of the RAM. Thereby, the control unit 70 can operate as a data acquisition unit (DATA ACQUIRE) 71, a relay resource determination unit (RELAY RESOURCE DETERMINE) 72, a correspondence table update unit (CORRESPONDENCE TABLE UPDATE) 73, a data transmission unit (DATA TRANSMIT) 74, a relay resource table update unit (RELAY RESOURCE TABLE UPDATE) 75, and a transmission source table update unit (TRANSMIT SOURCE TABLE UPDATE) 76. Execution of these functions indicates execution of a relay method corresponding to the relay program.

The data acquisition unit 71 acquires, from the wireless communication unit 61, data transmitted from the terminal 20 and received by the wireless communication unit 61. The data acquired by the data acquisition unit 71 is hereinafter referred to as acquired data.

The relay resource determination unit 72 determines a relay resource based on the header information included in the acquired data and the correspondence tale. The header information includes the source address, the destination address, and protocol, which are stored in the IP header. For example, a higher layer header, such as TCP header may include one or both of a source port and a destination port.

The source address, the source port, the destination address, and the protocol described in the header of the acquired data may be "1.0.0.1", "62000", "a.b.c.1", and "TCP", respectively. When a correspondence entry, which corresponds to the header information included in the acquired data, exists in the correspondence table, the correspondence entry including the same information as the header information of the acquired data is defined in the correspondence table, and the corresponding relay resource is defined as the relay resource for transmitting the acquired data.

When the correspondence entry, which corresponds to the header information included in the acquired data, does not exist in the correspondence table, the correspondence table update unit 73 generates a new correspondence entry to include the header information of the acquired data, and adds the generated correspondence entry to the correspondence table. When the correspondence table update unit 73 updates the correspondence table, such as adding the correspondence entry to the correspondence table, the relay resource determination unit 72 refers to the updated correspondence table and determines the relay resource.

As described above, when the correspondence entry, which corresponds to the header information included in the acquired data, does not exist in the correspondence table, the correspondence table update unit 73 generates a new correspondence entry to include the header information of the acquired data, and adds the generated correspondence entry to the correspondence table. The following will describe a process executed by the correspondence table update unit 73 with reference to FIG. 7.

The data transmission unit 74 transmits the acquired data to the destination address using the relay resource determined by the relay resource determination unit 72.

The relay resource table update unit 75 updates the relay resource table, which is shown in FIG. 4 as an example. In each relay resource entry that constitutes the relay resource table, the communication conversion process and the identification resource are available communication conversion process and available identification resource, which are available from the management information entity 41 that manages the relay resource. The relay resource table update unit 75 can acquire, from the management information entity 41, available information indicating the relay resources. The relay resource indicates a network resource used for data transmission from the relay device 60 to the destination address.

There may be multiple management information entities 41. This is because multiple relay resources may be provided by different WANs 40.

The relay resource table update unit 75 generates a new relay resource entry by adding a predetermined communication request class to the relay resource acquired from the management information entity 41. The communication request class is defined based on the relay resource acquired from the management information entity. Then, the generated relay resource entry is added to the relay resource table. The management information entity 41 may transmit, to the relay device 60, information indicating the available relay resource when there is a change in the available relay resource. The available relay resource means the relay resource the management information entity 41 is able to provide.

The relay device 60 may request the management information entity 41 to provide an additional relay resource. In response to the request from the relay device 60, the management information entity 41 may transmit, to the relay device 60, information indicating the available relay resource. The available relay resource means the relay resource the management information entity 41 is able to provide. When the relay device 60 requests the management information entity 41 to provide the additional relay resource, the relay device 60 may predict that a space of the relay resources contained in the relay resource table will be insufficient for the additional relay resource. For example, when 90% of the ports allocated by the management information entity 41 have been used, the relay device 60 may predict that relay resources are insufficient for the additional relay resource.

A user who operates the relay device 60 may obtain the available relay resource by inquiring the administrator who manages the management information entity 41, or may obtain the available relay resource from information disclosed on the internet by the administrator. The relay resource table update unit 75 also adds the relay resource entry, which is obtained by the input operation made by the user, to the relay resource table.

The transmission source table update unit 76 updates the transmission source table when the transmission source update information for updating the transmission source table is provided. The transmission source update information includes the header information and the communication request class. The transmission source table correlates data transmitted from the terminal 20 with a requested communication class (that is, the communication request class). For example, the communication request class may be defined as the requested communication quality. The terminal 20 corresponds to the transmission source device. Thus, the transmission source update information may be provided by the terminal 20 or a management device that manages the terminal 20. As another example, the user who manages the relay device 60 may input the transmission source update information to the relay device 60. The transmission source table update unit 76 may add a transmission resource entry to the transmission source table in response to an input operation made by the user.

(Process Executed by Control Unit 70)

Figure 6:
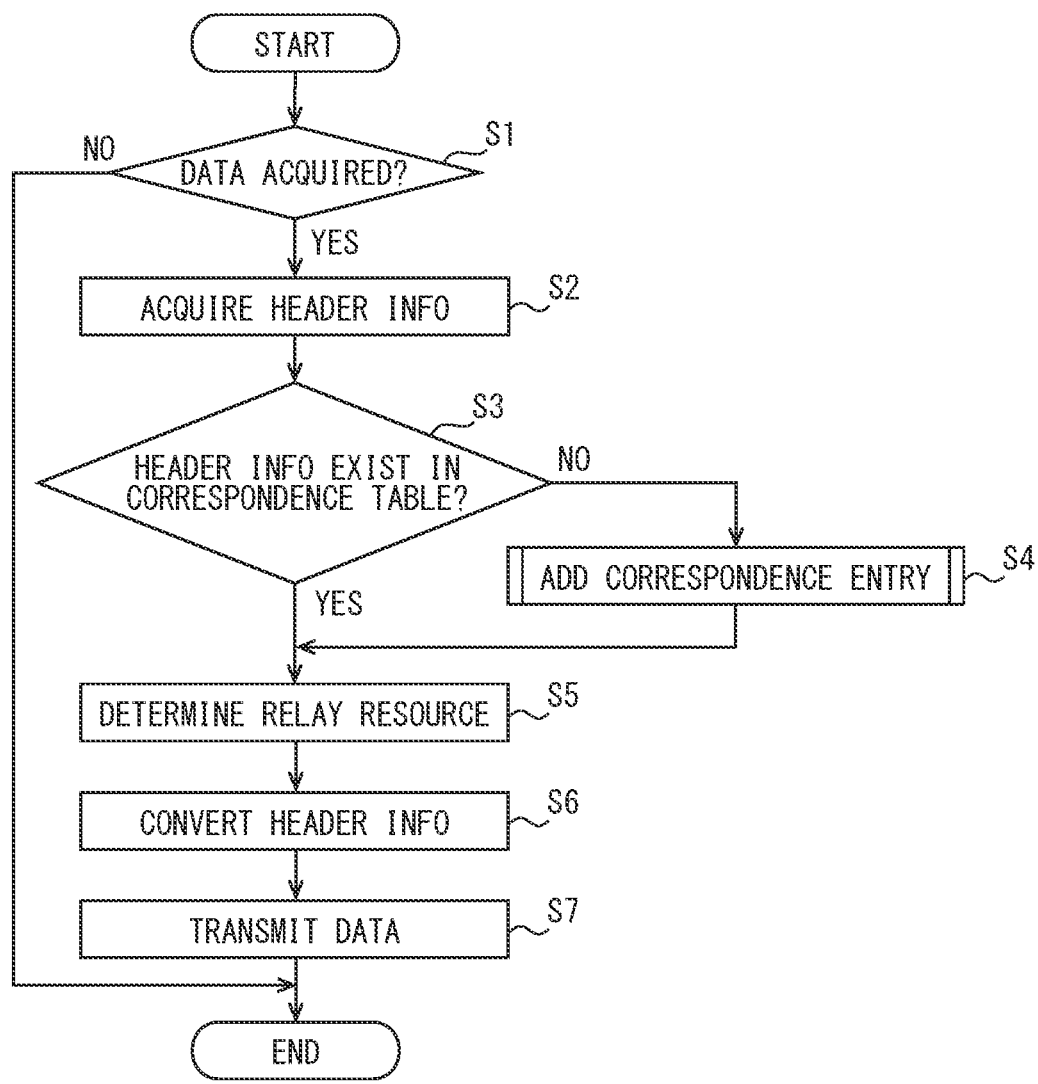
FIG. 6 is a diagram showing a flow of process executed by a control unit.

FIG. 6 shows a flowchart of a process executed by the control unit 70. The control unit 70 performs the process shown in FIG. 6 at regular intervals after powered on. In S1, the data acquisition unit 71 determines whether the data transmitted from the terminal 20 is acquired. When the determination result in S1 is NO, the process shown in FIG. 6 is terminated. When the determination result in S1 is YES, the process proceeds to S12.

In S2, the relay resource determination unit 72 acquires the header information from the data acquired in S1. In S3, the correspondence table update unit 73 determines whether the header information acquired in S2 exists in the correspondence table. When the determination result in S3 is NO, the process proceeds to S4.

Figure 7:
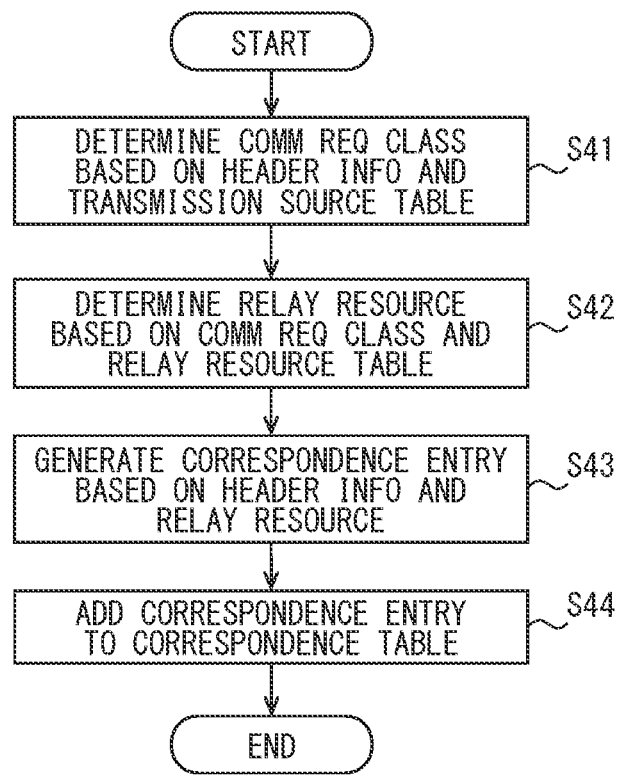
FIG. 7 is a diagram showing details of a process executed in S4 of FIG. 6.

In S4, the correspondence table update unit 73 generates a new correspondence entry to include the header information of the acquired data, and adds the generated correspondence entry to the correspondence table. FIG. 7 shows details of a process executed in S4 of FIG. 6. As shown in FIG. 7, in S41, the process determines the communication request class based on the header information acquired in S2 and the transmission source table. In S42, the process determines the relay resource based on the communication request class determined in S41 and the relay resource table. In S43, the process generates a correspondence entry by combining the header information acquired in S2 and the relay resource determined in S42. In S44, the process adds the correspondence entry generated in S43 to the correspondence table.

The processing shown in FIG. 7 will be described using a specific example. For example, in S2, the relay resource determination unit acquires the header information including the source address, the source port, the destination address, and the protocol, respectively, defined as "1.0.0.1", "62000", "a.b.c.1", and "TCP".

This header information corresponds to the header information defined by the first source entry in the transmission source table. Thus, in S41, the correspondence table update unit defines the QoS class of the acquired data having the above-described header information is 1 by referring to the transmission source table.

In S42, the correspondence table update unit refers to the relay resource table. In the relay resource table, when the QoS class is defined as 1, NAPT is executed to convert the IP address to e.f.g.h and one port among ports 500001 to 51000 is assigned to the source port. For example, the port 510010 is assigned as the source port.

In S43, the process generates the correspondence entry by combining the header information acquired in S2 and the relay resource determined in S42. In S44, the process adds the generated correspondence entry to the correspondence table. The first correspondence entry in the correspondence table of FIG. 5 is the correspondence entry generated and added as described above.

After S4 is executed, or when the determination result in S3 is YES, the process proceeds to S5. In S5, the relay resource determination unit 72 specifies the correspondence entry including the header information acquired in S2 by referring to the correspondence table, and determines the corresponding relay resource. For example, in S2, when the relay resource determination unit acquires the header information including the source address, the source port, the destination address, and the protocol, respectively, defined as "1.0.0.1", "62000", "a.b.c.1", and "TCP", the relay resource determination unit 72 specifies the first correspondence entry included in the correspondence table shown in FIG. 5.

At S6, the data transmission unit 74 converts the header information based on the relay resource determined in S5. When using the first correspondence entry in the correspondence table of FIG. 5, the header information of LAN, that is, the source address and the source port included in the header information of the transmission source are converted from 1.0.0.1:62000 to e.f.g.h:510010. Since the source address is converted to e.f.g.h, the resource assigned to the address of e.f.g.h can be used as the relay resource, and the data is transmitted to the destination address.

In S7, the data transmission unit 74 transmits the data including the header information converted in S6 using the relay resource determined in S5.

Summary of First Embodiment

As described above, when the relay device 60 acquires the data from the terminal 20, the relay device 60 determines the relay resource by referring to the header information included in the acquired data and the correspondence table included in the acquired data (S5). The correspondence table correlates the header information with corresponding relay resource. Each relay resource implements the communication request class defined corresponding to the header information. By determining the relay resource based on the header information and the correspondence table, it is possible to select the proper relay resource corresponding to the communication request class requested by the acquired data. With this configuration, the relay device 60 can select the proper relay resource corresponding to the communication request requested by the terminal 20 even when the terminal 20 does not perform the signaling.

The storage unit 63 stores the transmission source table and the relay resource table in addition to the correspondence table. The relay device 60 includes the correspondence table update unit 73. When the header information of the acquired data does not exist in the correspondence table (S3: NO), the correspondence table update unit 73 determines the correspondence entry to be added to the correspondence table based on the header information of the acquired data, the transmission source table, and the relay resource table. Specifically, the correspondence table update unit 73 determines the communication request class of the acquired data (S41) by referring to the header information included in the acquired data and the transmission source table. Then, the correspondence table update unit 73 determines the relay resource based on the determined communication request class and the relay resource table (S42), and generates the correspondence entry by combining the header information and the determined relay resource (S43). Then, the correspondence table update unit 73 adds the generated correspondence entry to the correspondence table (S44). As described above, when the correspondence entry, which corresponds to the header information included in the acquired data, does not exist in the correspondence table, the correspondence table update unit 73 generates and adds the correspondence entry, which includes the header information of the acquired data, to the correspondence table. Thus, the relay resource determination unit 72 can select the proper relay resource for the communication request requested by the terminal 20 by referring to the updated correspondence table.

The relay resource table update unit 75 may also update the relay resource table used for generating the correspondence table. Therefore, the correspondence table generated based on the relay resource table can support various transmission source devices and various communication request classes.

The relay resource table update unit 75 acquires information indicating the available relay resource from the management information entity 41 that manages the relay resources. The available relay resource indicates the relay resource the management information entity 41 is able to provide. Then, the relay resource table update unit 75 generates a relay resource entry by adding a communication request class to the acquired relay resource, and adds the generated relay resource entry to the relay resource table.

Since the relay resource table update unit 75 updates the relay resource table in this manner, a relay resource, which the management information entity 41 cannot provide, is prevented from being added to the relay resource table.

The relay resource table update unit 75 requests the management information entity 41 to provide additional relay resource when the relay resources included in the relay resource table are insufficient. When the management information entity 41 provides an additional relay resource, the relay resource table update unit 75 may add a new relay resource entry to the relay resource table. The new relay resource entry may indicate a correspondence between the additionally provided relay resource and a communication request class implemented by the additionally provided relay resource. Since the relay device 60 requests the management information entity 41 to provide the additional relay resource, failure of data relay in the relay device 60 can be avoided due to insufficiency of relay resource.

The relay resource table update unit 75 may add the relay resource entry, which is obtained by the input operation made by the user, to the relay resource table. With this configuration, the types of relay resources included in the relay resource table and the correspondence table can be easily added.

The transmission source table update unit 76 may update the transmission source table, which is another table used to generate the correspondence table, in addition to the update of the relay resource table. For example, the transmission source table update unit 76 updates the transmission source table based on the transmission source update information when the transmission source update information for updating the transmission source table is provided by the terminal 20 or a management device of the terminal 20. The transmission source table update unit 76 may add a transmission resource entry to the transmission source table in response to an input operation made by the user. By updating the transmission source table, the correspondence table generated based on the transmission source table can support various transmission source devices and various communication request classes.

Second Embodiment

The following describes a second embodiment. In the following description of the second embodiment, elements having the same reference symbols as those used so far are the same as the elements having the same reference symbols in the previous embodiment, except when specifically mentioned. When only a part of the configuration is described, the embodiment described above can be applied to remaining parts of the configuration.

Figure 8:
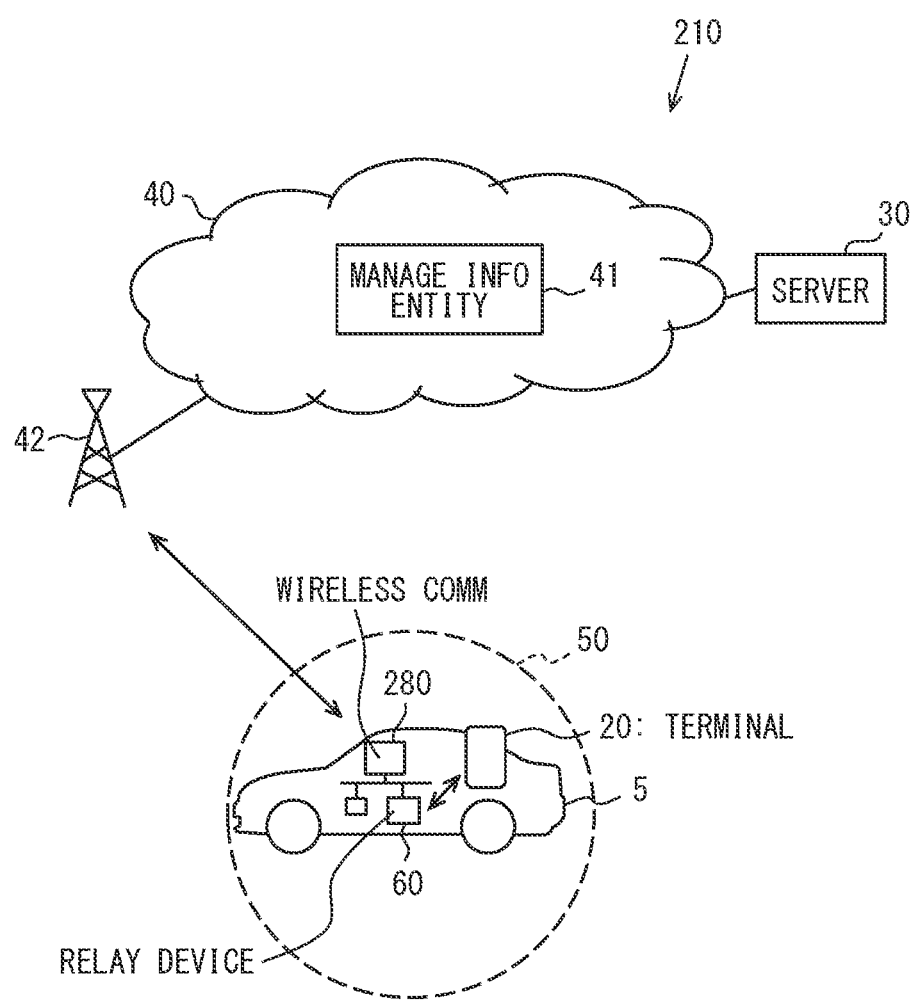
FIG. 8 is a diagram showing an overall configuration of a communication system according to a second embodiment of the present disclosure.

FIG. 8 shows an overall configuration of a communication system 210 according to the second embodiment. In the present embodiment, the relay device 60 included in the communication system 210 is mounted on a vehicle 5. The vehicle 5 is equipped with a wide area wireless communication unit 280. The wide area wireless communication unit 280 communicates with a base station 42, which is included in the WAN 40. For example, the communication method between the wide area wireless communication unit 280 and the base station 42 may include 3G, 4G, and 5G defined under third generation partnership project (3GPP). The relay device 60 relays communication between the terminal 20 and the wide area wireless communication unit 280. The management information entity 41 manages resources of the WAN 40, and also performs charging management for use of the WAN 40.

The relay device 60 and the terminal 20 communicate with one another using the short range wireless communication method, as similar to the first embodiment. The relay device 60 communicates with the terminal 20 through the wireless communication unit 61. The relay device 60 communicates with the wide area wireless communication unit 280 through the wired communication unit 62. The relay device 60 and the wide area wireless communication unit 280 are communicably connected with one another by an in-vehicle LAN. A state in which the terminal 20 communicates with the server 30 or the like connected to the WAN 40 through the relay device 60 and the wide area wireless communication unit 280 is referred to as a tethering state.

In the second embodiment, the storage unit 63 included in the relay device 60 stores a transmission source table shown in FIG. 9, a relay resource table shown in FIG. 10, and a correspondence table shown in FIG. 11. The transmission source table shown in FIG. 9 differs from the transmission source table shown in FIG. 3 in that the communication request class is defined by two specific elements including the QoS class and a charging destination (CHARGE DEST). The relay resource table shown in FIG. 10 defines the communication request class using two specific elements including the QoS class and the charging destination, corresponding to the transmission source table shown in FIG. 9. In the relay resource table shown in FIG. 10, the difference in identification resources of the relay resource entries is the difference in allocated source port areas.

In FIG. 9, the destination address "app server" indicates an application server. In FIG. 9, "app server" is used for simplification purpose. In actual use, the global IP address of the application server is described in the transmission source table.

In FIG. 9 and FIG. 10, QoS class of "1" is defined as a communication class with higher priority than the QoS class of "2". In FIG. 9, the QoS class is defined as "1" when the destination address is the address indicating the application server or the protocol is RTP. Thus, higher priority is given to a communication that transits the data to the application server, or the higher priority is given to the protocol defined as RTP. As shown in FIG. 9 and FIG. 10, the same QoS class "1" has different charging destinations. Therefore, in FIG. 10, the allocated port areas are set different depending on the charging destinations so that the charging destination can be distinguished.

The first correspondence entry in the correspondence table shown in FIG. 11 is generated based on the first transmission source entry in the transmission source table and the first relay resource entry in the relay resource table. When the header information is converted by the first correspondence entry, the source port number is defined as "50010". Based on the defined source port number, the administrator who provides the WAN 40 can understand that the communication charge for the data including the corresponding header information should be charged to the vendor.

In the first embodiment described above, the relay device 60 is connected to the WAN 40. In the second embodiment, the relay device 60 is not connected to the WAN 40. In the second embodiment, the relay device 60 transmits the data to the wide area wireless communication unit 280 which is connected to the WAN 40. In addition to the relay device 60, other devices that perform communication via the WAN 40 are connected to the wide area wireless communication unit 280. Hereinafter, a device that is connected to the wide area wireless communication unit 280 and performs the communication via the wide area wireless communication unit is also referred to as a connection device. In order to prevent exhaustion of the port area for each charging destination when performing communication via the WAN 40, it is assumed that the wide area wireless communication unit 280 allocates the port areas to each connection device by limiting the number of ports that can be used simultaneously. Thus, when a request for an additional port or the like is necessary, the relay device 60 notifies the request to the wide area wireless communication unit 280 instead of the entity included in the WAN 40. When additional port or the like is provided in response to the request requested by the relay device, the relay resource table update unit 75 updates the relay resource table. In this configuration, by converting the header information based on the correspondence table, the relay device 60 can select proper relay resource corresponding to the communication request requested by the terminal 20 even when the terminal 20 does not perform the signaling.

Third Embodiment

Figure 12:
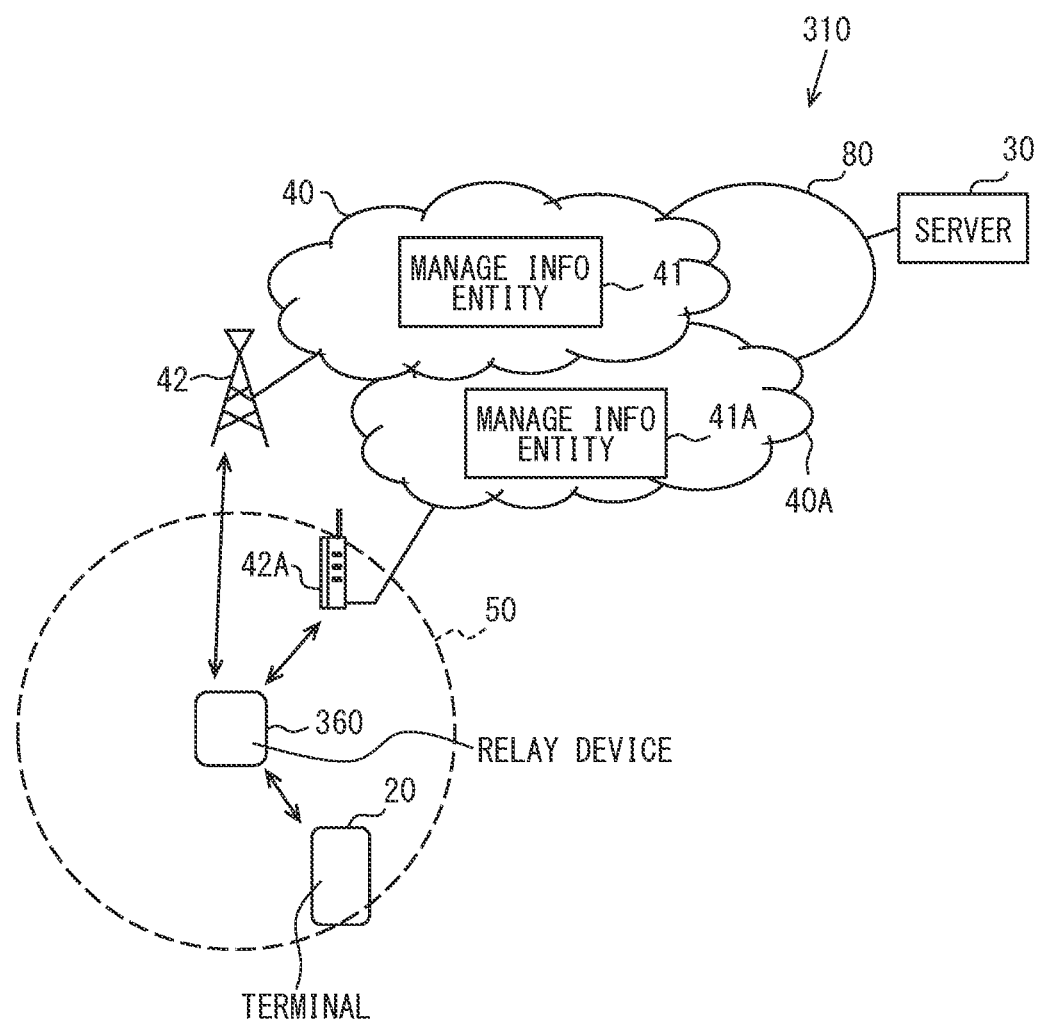
FIG. 12 is a diagram showing an overall configuration of a communication system according to a third embodiment of the present disclosure.

FIG. 12 shows an overall configuration of a communication system 310 according to a third embodiment. The communication system 310 includes the WAN 40 similar to the previous embodiments. The management information entity 41 manages resources of the WAN 40, and performs charge management for use of the WAN 40.

In addition to the WAN 40, the communication system 310 has another network 40A. The WAN 40 corresponds to a first network, and the network 40A corresponds to a second network. The second network 40A is also referred to as a second NW 40A. The second network 40A is a different network from the first network, that is, the WAN 40. For example, the second network may be a public wireless LAN. The second network 40A may be a WAN provided by a provider different from the provider of the WAN 40. A management information entity 41A is a management device that manages the resources of the second network 40A. The management information entity 41A allocates IP addresses under dynamic host configuration protocol (DHCP). The management information entity 41A also performs charge management for use of the second network 40A. The second network 40A includes a base station 42A.

The WAN 40 and the second network 40A communicate with server 30 via an internet 80. The WAN 40 and the second network 40A may also be considered to be a part of the internet 80.

Figure 13:
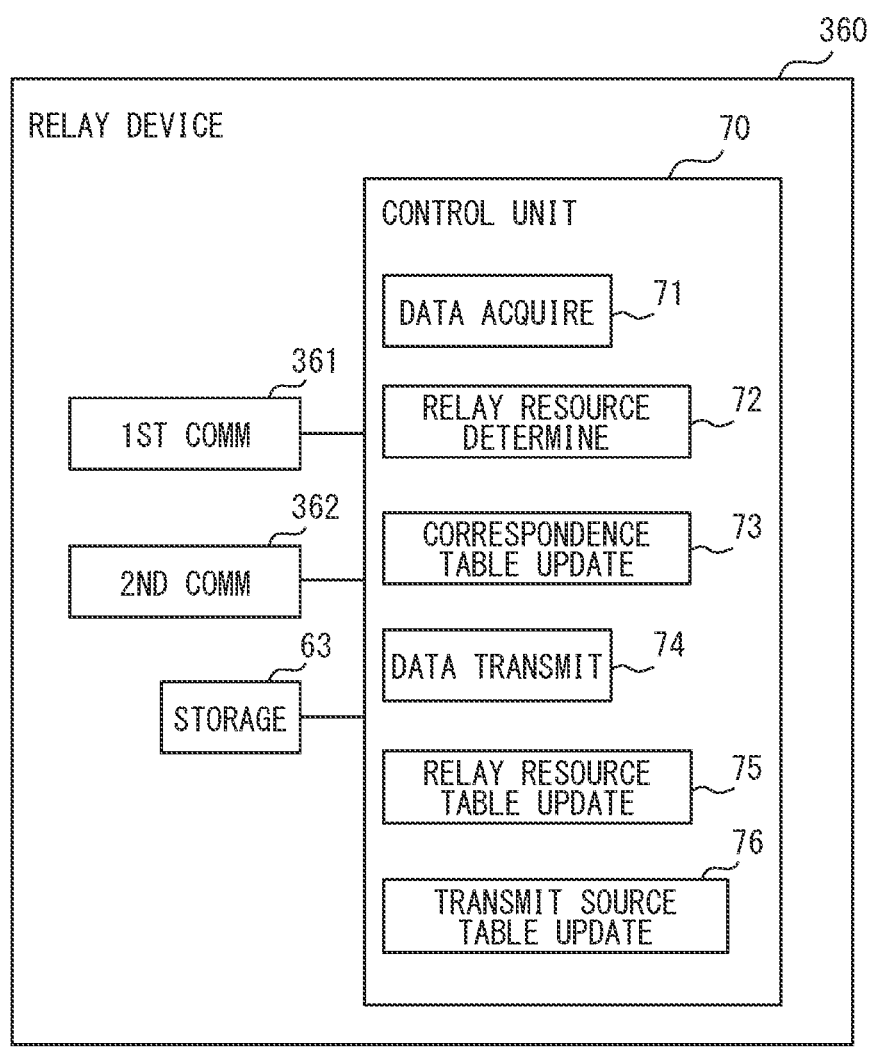
FIG. 13 is a diagram showing a configuration of a relay device.

In the third embodiment, the relay device 360 communicates with the base station 42 and the base station 42A. FIG. 13 shows a configuration of the relay device 360. The relay device 360 includes a first communication section (1ST COMM) 361 and a second communication section (2ND COMM) 362. The first communication unit 361 communicates with the base station 42. The second communication unit 362 communicates with the base station 42A.

In the third embodiment, the storage unit 63 included in the relay device 360 stores a transmission source table shown in FIG. 14, a relay resource table shown in FIG. 15, and a correspondence table shown in FIG. 16. In the transmission source table shown in FIG. 14, the communication request class is defined by two specific elements including a via network and a charging destination. The via network is also referred to as via NW.

The relay resource table shown in FIG. 15 defines the communication request class using two specific elements including the via NW and the charging destination, corresponding to the transmission source table shown in FIG. 14.

In the relay resource table shown in FIG. 15, the identification resource is defined by using two specific elements including a source port area and a source IP address area. The source port area indicates an area of port number that can be selected as a source port. The source IP address area indicates an area that can be selected as a source IP address. The IP addresses shown in the source IP address area include "e.f.g.h" and "i.j.k.1-5". The IP address of "i.j.k.1-5" indicates one of IP addresses of "i.j.k.1", "i.j.k.2", "i.j.k.3", "i.j.k.4", and "i.j.k.5". The IP address "e.f.g.h" is used by the WAN 40, and the IP address "i.j.k.1-5" is used by the second network 40A.

The first correspondence entry in the correspondence table shown in FIG. 16 is generated based on the first transmission source entry in the transmission source table and the first relay resource entry in the relay resource table. When the header information is converted by the first correspondence entry, data transmission is performed by using the WAN 40. When the header information is converted by the first correspondence entry, the source port number is set as, for example, "50010". Based on the set source port number, the administrator who provides the WAN 40 can understand that the communication charge for the data including the corresponding header information should be charged to the vendor.

Although not shown in FIG. 16, when a correspondence entry is generated based on a transmission source entry of the transmission source table in which the via network is set as 2, the source IP address in the relay resource table is set as "i.j.k.1-5". When the header information is converted by this correspondence entry, data transmission is performed by using the second network 40A.

In the third embodiment, the relay resource table includes multiple relay resource entries in which relay resources are set as source IP addresses used in different networks. When the correspondence table is generated based on this relay resource table, the correspondence table also includes multiple correspondence entries in which the source IP addresses after conversion are set as source IP addresses used in different networks. In this configuration, by converting the header information based on the correspondence table, the relay device can select proper relay resource to relay the data corresponding to the communication request requested by the terminal 20 even when the terminal 20 does not perform the signaling.

Fourth Embodiment

Figure 17:
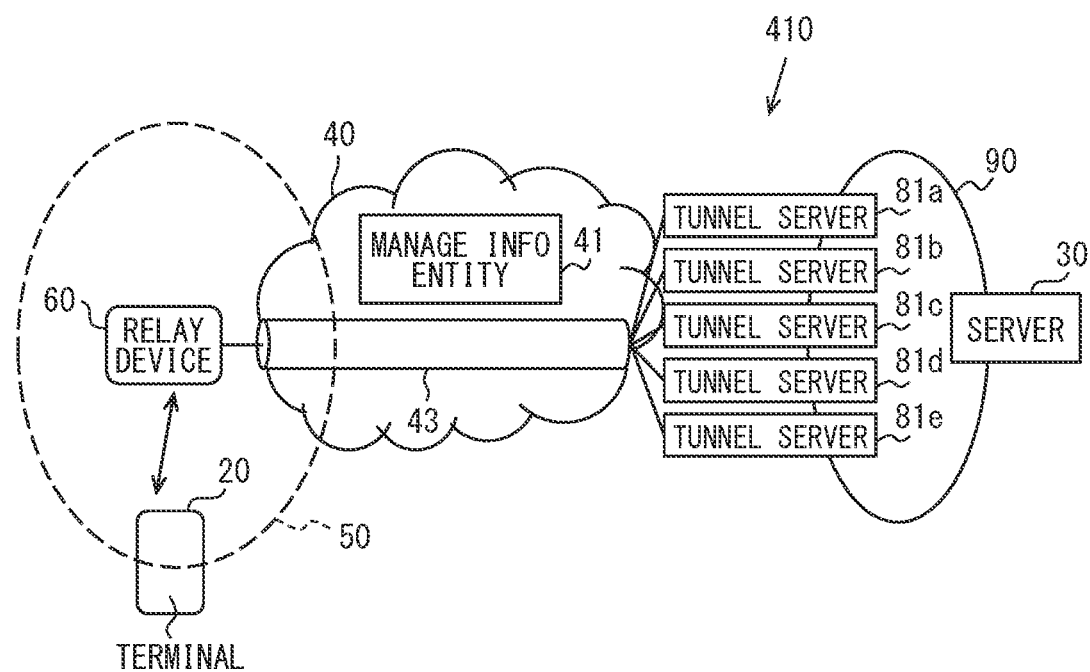
FIG. 17 is a diagram showing an overall configuration of a communication system according to a fourth embodiment of the present disclosure.

FIG. 17 shows an overall configuration of a communication system 410 according to a fourth embodiment. The communication system 410 includes the WAN 40 similar to the previous embodiments. The management information entity 41 manages resources of the WAN 40, and performs charge management for use of the WAN 40. In the present embodiment, the WAN 40 includes a virtual dedicated line 43. Herein, the virtual dedicated line indicates a communication line virtually defined within the WAN 40 for dedicated use purpose.

The relay device 60 uses the virtual dedicated line 43 to communicate with tunnel servers 81a, 81b, 81c, 81d, and 81e. Hereinafter, the tunnel servers 81a, 81b, 81c, 81d, and 81e are referred to as the tunnel server 81 when it is not necessary to distinguish the multiple tunnel servers.

When transmitting the data to the virtual dedicated line 43, the relay device 60 encapsulates the data acquired from the terminal 20. That is, the relay device 60 encapsulates entire acquired data, adds a new header to the encapsulated data, and transmits the data to the virtual dedicated line 43. The tunnel server 81 can communicate with the server 30 via a LAN 90.

In the fourth embodiment, the storage unit 63 included in the relay device 60 stores a transmission source table shown in FIG. 18, a relay resource table shown in FIG. 19, and a correspondence table shown in FIG. 20. In the transmission source table shown in FIG. 18, the communication request class is defined as a charging destination.

The relay resource table shown in FIG. 19 defines the communication request class as the charging destination corresponding to the transmission source table shown in FIG. 18. In the relay resource table shown in FIG. 19, the identification resource is defined as the tunnel server address. In the relay resource table, tunnel server addresses are set by different addresses corresponding to the different charging destinations.

The correspondence table shown in FIG. 20 is generated from the transmission source table shown in FIG. 18 and the relay resource table shown in FIG. 19. An example of generating the first correspondence entry in the correspondence table will be described below. The source address, the source port, the destination address, and the destination port (DST PORT) described in the header of the acquired data, which is acquired from the terminal 20 via the LAN 50, may be "1.0.0.0", "62000", "1.0.1.10", and "80", respectively.

In the transmission source table, the second transmission source entry is specified as the entry corresponding to the source address and the destination address included in the header of the acquired data. In the second source entry, the charging destination is set as vendor2. In the relay resource table, the second relay resource entry is specified as the entry corresponding to the cVharging destination of vendor2. Thus, the tunnel server address is set as "p.q.r.2" based on the relay resource table.

The destination address of "p.q.r.2" in the first correspondence entry is determined as described above. The first correspondence entry also indicates that the source address is set as "e.f.g.h". Herein, the source address of "e.f.g.h" indicates the IP address of the relay device 60.

In the fourth embodiment, the data transmission unit 74 encapsulates the acquired data and adds a new header when transmitting the acquired data to the virtual dedicated line 43. In the newly added header, the source IP address is always set as "e.f.g.h", which is the IP address of the relay device 60. Thus, in the correspondence table, the source address of the header to be added is set as "e.f.g.h".

When the source IP address and the source port number included in the header of the acquired data are "1.0.0.1" and "62000", respectively, the first correspondence entry in the correspondence table is referred. Then, the data transmission unit 74 transmits the acquired data to the virtual dedicated line 43 by adding a header, which includes the source IP address of "e.f.g.h" and the destination IP address of "p.q.r.2".

The tunnel server corresponding to the destination IP address of "p.q.r.2" is the tunnel server 81b. When the tunnel server 81b acquires the data transmitted from the relay device 60, the tunnel server 81b decrypts the encapsulated data. When the data is decrypted, the tunnel server can read the original header at a transmission time of the data from the terminal 20. Then, the tunnel server 81b transmits the data to the destination defined in the original header.

In the fourth embodiment, the relay resource table defines the communication request class (specifically, charging destination) in correlated manner with the tunnel server address. The correspondence table correlates the header information and the tunnel server address.

Usually, when the data transmitted from the relay device 60 is encapsulated, the management information entity 41 cannot see the header information generated by the terminal 20. Thus, in a case where the charging destination needs to be changed corresponding to the communicated data, the charging destination cannot be determined since the header information generated by the terminal 20 is unknown. In the fourth embodiment, the correspondence table is generated from the transmission source table, which indicates a correlation between the header information generated by the terminal 20 and the charging destination defined as the communication request class, and the relay resource table, which indicates a correlation between the charging destination and the tunnel server address. With the above configuration, the relay device 60 can determine a specific tunnel server 81 as the destination by referring to the correspondence table. Thus, the management information entity 41 can determine the charging destination based on the tunnel server 81 determined as the destination.

Fifth Embodiment

Figure 21:
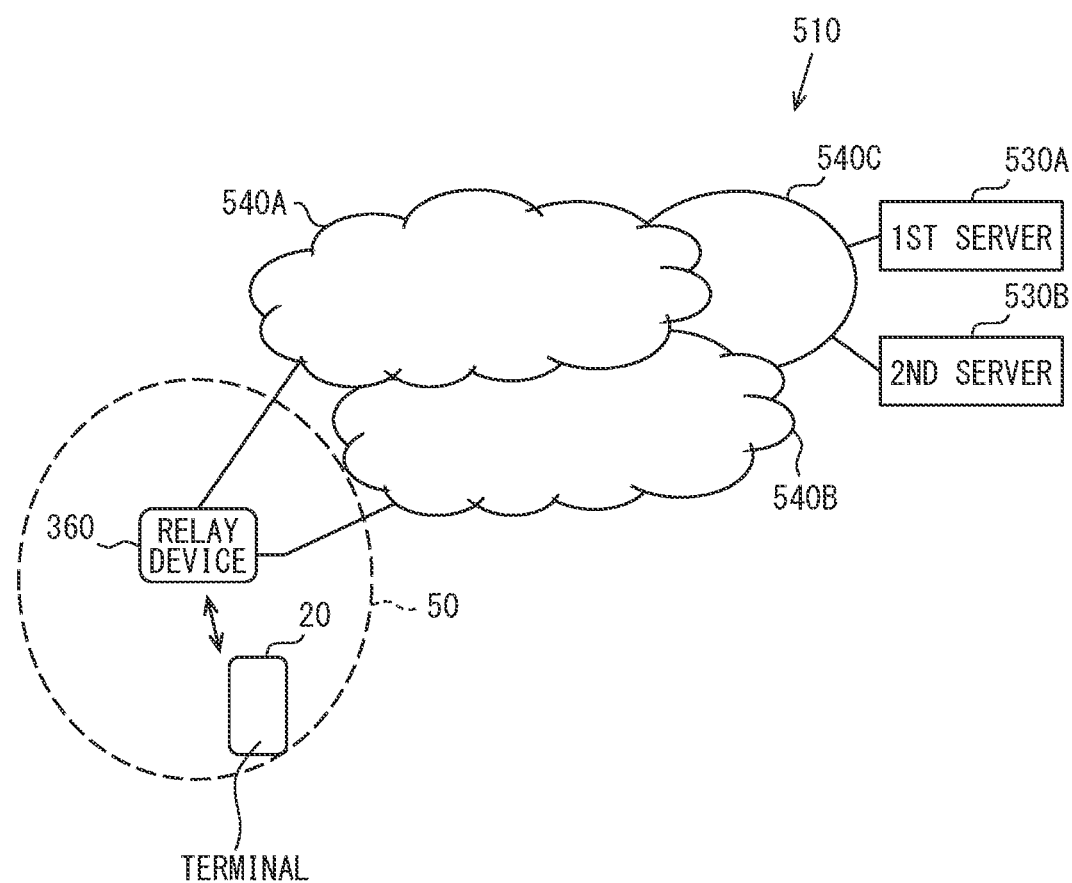
FIG. 21 is a diagram showing an overall configuration of a communication system according to a fifth embodiment of the present disclosure.

FIG. 21 shows an overall configuration of a communication system 510 according to a fifth embodiment. The communication system 510 includes three LANs, that is, a first LAN 540A, a second LAN 540B, and a third LAN 540C. The first LAN 540A has a lower delay than that of the second LAN 540B. For example, the first LAN 540A may be a wired LAN, and the second LAN 540B may be a wireless LAN. As another example, both of the first LAN 540A and the second LAN 540B may be wireless LANs, and the first LAN 540A has a lower delay than that of the second LAN 540B when the first LAN 540A complies with a relatively new wireless communication standard.

The third LAN 540C is connected to a first server 530A and a second server 530B, which correspond to destination devices. Both of the first server 530A and the second server 530B communicate with the terminal 20 via the third LAN 540C. The third LAN 540C is connected to the first LAN 540A and the second LAN 540B.

The first server 530A requires lower delay communication than that of the second server 530B. For example, the first server 530A may be a web conferencing server and the second server 530B is a file server. For example, the IP address of the first server 530A is set as 1.0.1.1, and the IP address of the second server 530B is set as 1.0.1.100.

In the fifth embodiment, the relay device 360 is able to connect to the first LAN 540A and is also able to connect to the second LAN 540B.

In the fifth embodiment, the storage unit 63 included in the relay device 360 stores a transmission source table shown in FIG. 22, a relay resource table shown in FIG. 23, and a correspondence table shown in FIG. 24. In the transmission source table shown in FIG. 22, each transmission source entry is correlated with a source port included in the header information, and is also correlated with the QoS class as the communication request class. The QoS class is classified under a criterion whether a low-latency communication can be included or not.

The relay resource table shown in FIG. 23 defines the communication request class as the QoS corresponding to the transmission source table shown in FIG. 22. The QoS class may be defined as a low delay or normal. As described above, since the first LAN 540A has a lower delay than that of the second LAN 540B, in the correspondence table, the first LAN 540A is used as the relay resource when a low delay is required as the communication request class.

The second relay resource entry in the relay resource table defines the identification resource as the first LAN 540A and the second LAN 540B. That is, either the first LAN 540A or the second LAN 540B may be used as the relay resource in the second correspondence entry.

The correspondence table shown in FIG. 24 is a routing table. The correspondence table shown in FIG. 24 defines a via interface (via IF) between the first LAN 540A and the second LAN 540B when transmitting the data. In the first correspondence entry shown in FIG. 24, when the destination IP address is 1.0.1.1, the first LAN 540A is used as the relay resource, that is, the via IF.

The following will describe an example of generating the first correspondence entry shown in FIG. 24 from the data transmitted from the terminal 20, the transmission source table shown in FIG. 22, and the relay resource table shown in FIG. 23. The source address, the source port, the destination address, and the destination port described in the header of the acquired data, which is acquired from the terminal 20 by the relay device 360, may be "1.0.0.1", "5012", "1.0.1.1", and "80", respectively. The transmission source table is generated based on information provided by the terminal 20 or an administrator who manages the terminal 20. Thus, the terminal 20 shares the transmission source table shown in FIG. 22 with the relay device 360. The terminal 20 requests a low delay communication with the destination IP address of "1.0.1.1", that is, the first server 530A. Thus, the data is transmitted using the source port defined in the first source entry of the transmission source table.

When the relay device 360 acquires, from the terminal 20, the data having header information requiring the low delay communication, the relay device 360 determines that the QoS class may include the low delay communication by referring to the transmission source table. Thus, the first LAN 540A is set as the via IF by referring to the relay resource table. Then, the correspondence entry is generated by correlating the destination address "1.0.1.1" included in the header of the data acquired from the terminal 20 with the first LAN 540A.

According to the fifth embodiment, the relay device 360 can select the proper relay route for the communication request requested by the terminal 20 without the signaling of the terminal 20.

Although embodiments of the present disclosure have been described above, the present disclosure is not limited to the above-described embodiments, and the following modifications are also included in the present disclosure. Further, various modifications can be made without departing from the spirit of the present disclosure.

(First Modification)

When the correspondence table is generated in advance based on the transmission source table and the relay resource table, the storage unit 63 does not need to store the transmission source table and the relay resource table.

(Second Modification)

The control unit 70 and the method thereof according to the present disclosure may be implemented by one or more special-purposed computers. Such a special-purposed computer may be provided (i) by configuring a processor and a memory programmed to execute one or more functions embodied by a computer program, or (ii) by configuring a processor including one or more dedicated hardware logic circuits. Alternatively, the control unit 70 and the method thereof according to the present disclosure may be implemented by a dedicated hardware logic circuit. Alternatively, the control unit 70 and the method thereof according to the present disclosure may be implemented by one or more dedicated computers configured to include a combination of a processor for executing computer program and at least one hardware logic circuit. The hardware logic circuit may be, for example, ASIC or FPGA.

The storage medium for storing the computer program is not limited to a ROM. The computer program may also be stored in a computer-readable non-transitory tangible storage medium as instructions to be executed by the computer. For example, the computer program may be stored in a flash memory.

What is claimed is:

1. A relay device that acquires data from a transmission source device and transmits the acquired data to a destination device, the relay device comprising:

a storage unit storing a correspondence table that correlates header information with a relay resource, the relay resource implementing a communication request class defined based on the header information;

a data acquisition unit acquiring the data transmitted from the transmission source device as acquired data;

a relay resource determination unit determining the relay resource for the acquired data based on the header information included in the acquired data and the correspondence table;

a data transmission unit transmitting the acquired data to the destination device using the relay resource determined by the relay resource determination unit; and a correspondence table update unit updating the correspondence table, wherein the storage unit stores, in addition to the correspondence table, a transmission source table, which individually defines the communication request class for the header information, and a relay resource table, which correlates the communication request class with the relay resource, and the correspondence table update unit:

determines a communication request class of the acquired data based on the header information included in the acquired data and the transmission source table;

determines the relay resource of the acquired data based on the determined communication request class of the acquired data and the relay resource table;

generates a correspondence entry by correlating the determined relay resource with the header information included in the acquired data; and adds the generated correspondence entry to the correspondence table.

2. The relay device according to claim 1, wherein, in a case where a correspondence entry, which corresponds to the header information included in the acquired data, does not exist in the correspondence table, the correspondence table update unit generates the correspondence entry for the acquired data and adds the generated correspondence entry to the correspondence table, and the relay resource determination unit determines the relay resource for the acquired data by referring to the correspondence table updated by the correspondence table update unit.

3. The relay device according to claim 1, further comprising a relay resource table update unit updating the relay resource table, wherein the relay resource table update unit:
acquires one or more available relay resources to be added as one or more relay resource entries of the relay resource table; and
updates the relay resource table by adding, to the relay resource table, the one or more relay resource entries generated based on the one or more available relay resources.

4. The relay device according to claim 3, wherein,
in a case where one or more relay resources defined by the one or more relay resource entries included in the relay resource table are not sufficient, the relay resource table update unit communicates with a management information entity that performs a relay resource management, and
in a case where the management information entity provides an additional relay resource, the relay resource table update unit:
generates a relay resource entry by correlating the additional relay resource provided by the management information entity with the communication request class implemented by the additional relay resource; and
adds the generated relay resource entry to the relay resource table.

5. The relay device according to claim 3, wherein
the relay resource table update unit adds a relay resource entry, which is determined by an input operation made by a user, to the relay resource table.

6. The relay device according to claim 1, further comprising
a transmission source table update unit updating the transmission source table,
wherein the transmission source table update unit:
acquires a transmission source entry to be added to the transmission source table; and
adds the acquired transmission source entry to the transmission source table.

7. The relay device according to claim 6, wherein,
in a case where the transmission source device or a management device that manages the transmission source device provides transmission source update information to be used in updating of the transmission source table, the transmission source table update unit updates the transmission source table based on the provided transmission source update information.

8. The relay device according to claim 6, wherein
the transmission source table update unit adds, to the transmission source table, a transmission resource entry that is determined by an input operation made by a user.

9. The relay device according to claim 1, wherein
the relay resource table includes multiple relay resource entries in which relay resources are set as transmission source addresses used in different networks.

10. The relay device according to claim 1, wherein
the relay resource table defines a correlation between the communication request class and a tunnel server address, and
the correspondence table defines a correlation between the header information and the tunnel server address.

11. A relay method of acquiring data from a transmission source device and transmitting the acquired data to a destination device, the relay method comprising:
acquiring the data transmitted from the transmission source device;
determining a relay resource for the acquired data based on header information included in the acquired data and a correspondence table, the correspondence table defining a correlation between the header information and the relay resource, the relay resource implementing a communication request class defined based on the header information;
transmitting the acquired data to the destination device using the determined relay resource; and
updating the correspondence table by:
determining a communication request class of the acquired data based on the header information included in the acquired data and a transmission source table, which individually defines the communication request class for the header information;
determining the relay resource of the acquired data based on the determined communication request class of the acquired data and a relay resource table, which correlates the communication request class with the relay resource;
generating a correspondence entry by correlating the determined relay resource with the header information included in the acquired data; and
adding the generated correspondence entry to the correspondence table.

12. A relay device that acquires data from a transmission source device and transmits the acquired data to a destination device, the relay device comprising:
a computer-readable non-transitory storage medium storing a program and a correspondence table, wherein the correspondence table defines a correlation between header information and a relay resource, which implements a communication request class defined based on the header information; and
a microcomputer, by executing the program stored in the computer-readable non-transitory storage, configured to:
acquire the data transmitted from the transmission source device;
determine the relay resource for the acquired data based on the header information included in the acquired data and the correspondence table;
transmit the acquired data to the destination device using the determined relay resource; and
update the correspondence table by:
determining a communication request class of the acquired data based on the header information included in the acquired data and a transmission source table, which individually defines the communication request class for the header information;
determining the relay resource of the acquired data based on the determined communication request class of the acquired data and a relay resource table, which correlates the communication request class with the relay resource;
generating a correspondence entry by correlating the determined relay resource with the header information included in the acquired data; and
adding the generated correspondence entry to the correspondence table.

* * * * *